United States Patent
Deao et al.

(10) Patent No.: US 6,931,636 B2
(45) Date of Patent: Aug. 16, 2005

(54) MULTIPROCESSOR EMULATION SUPPORT USING DYNAMIC LINKING

(75) Inventors: Douglas Deao, Brookshire, TX (US); Deborah Keil, Pittsburgh, PA (US); Robert McGowan, Monroeville, PA (US); Craig McLean, Irwin, PA (US); Gary Swoboda, Sugar Land, TX (US); Leland Szewerenko, Pittsburgh, PA (US)

(73) Assignee: Texas Instruments Incorporated, Dallas, TX (US)

( * ) Notice: Subject to any disclaimer, the term of this patent is extended or adjusted under 35 U.S.C. 154(b) by 637 days.

(21) Appl. No.: 09/887,504

(22) Filed: Jun. 22, 2001

(65) Prior Publication Data

US 2002/0026304 A1 Feb. 28, 2002

Related U.S. Application Data

(60) Provisional application No. 60/223,697, filed on Aug. 8, 2000.

(51) Int. Cl.$^7$ ................................................. G06F 9/44
(52) U.S. Cl. ...................... 717/167; 717/124; 717/138
(58) Field of Search ............................... 717/167, 124, 717/138, 162, 134; 719/318

(56) References Cited

U.S. PATENT DOCUMENTS

| | | | | |
|---|---|---|---|---|
| 5,410,703 A | * | 4/1995 | Nilsson et al. | 717/168 |
| 5,901,315 A | * | 5/1999 | Edwards et al. | 717/124 |
| 5,970,245 A | * | 10/1999 | Poteat et al. | 717/128 |
| 5,999,734 A | * | 12/1999 | Willis et al. | 717/149 |
| 6,557,054 B2 | * | 4/2003 | Reisman | 710/33 |
| 2001/0056341 A1 | * | 12/2001 | Pennello et al. | 703/22 |

* cited by examiner

*Primary Examiner*—John Chavis
(74) *Attorney, Agent, or Firm*—W. James Brady, III; Frederick J. Telecky, Jr.

(57) ABSTRACT

A method and system for dynamically linked emulation with a mix of target debuggers on a host computer wherein a debugger for each processor on the target system connects to a target interface for that kind of processor. That target interface then communicates with an emulator dynamic loader on the host computer connected to an emulator. The target interface communicates with the dynamic loader on the host computer to determine if there is support for the desired kind on the emulator. If not a target interface is loaded to the emulator and connected to the already running software on the host. A connection to this target interface software on the emulator is then provided to the host computer.

8 Claims, 1 Drawing Sheet

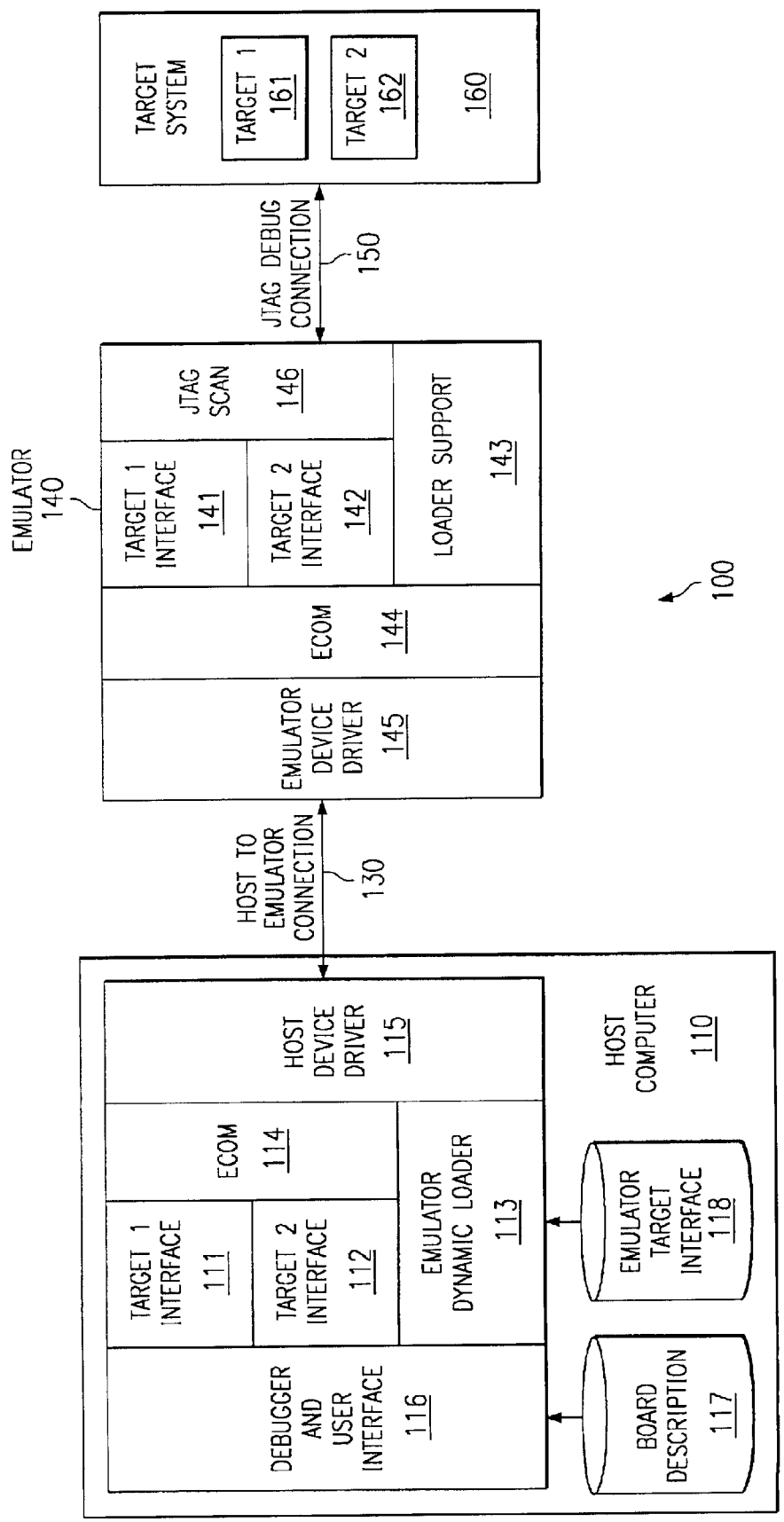

MULTIPROCESSOR EMULATION SUPPORT USING DYNAMIC LINKING

This application claims priority under 35 USC §119(e)(1) of provisional application Ser. No. 60/223,697, filed Aug. 8, 2000.

TECHNICAL FIELD OF THE INVENTION

The present invention relates to software and hardware tools used to develop embedded systems, and, more particularly, to the support of debugging in a heterogeneous multiprocessor embedded system.

BACKGROUND OF THE INVENTION

Digital signal processing refers to the electronic processing of signals, or any application that involves rapid numeric processing. The software development for applications on digital signal processors is an iterative process. A compiler translates source code into an assembly language source code. An assembler translates the assembly language source code files into machine language object files. Source files may contain instructions, assembly directives, and macro directives. A linker combines the object files into a single executable object module or program. As the linker creates the executable module, it performs symbolic relocation and resolves external references. The linker accepts object files created by the assembler as input. The linker also accepts archive or library members and output modules created previously. The objective of this development process is to produce an executable module that may be stored and executed on a device or processor.

Debugging tools are available to test processors and the linked, executable code. Application software development requires a level of simulation, observability and controllability of the software within the hardware system being developed. Tools for debugging software in a system context include simulators and emulators.

An emulator is a software development tool that allows software under development to be executed, controlled, and viewed in a real hardware environment. An emulator may be hardware, software or both. An emulator allows a user to perform software and hardware development, and to integrate the software and hardware with the target processor.

The most desirable form of emulator allows software development to occur in the real product hardware environment. To allow this form of emulation, the target processor provides an emulation interface that accesses its internal state. An emulation interface provides control and access to every memory location and register of the target processor, and extends the target processor architecture as an attached processor. The emulator can start or stop execution of the target processor program. When the target is stopped, the emulator has the capability to load, inspect, and modify all processor registers. Program data and program memory may be upgraded or downloaded.

Increasingly, embedded systems are being built whose purpose in whole or in part involves communication. The need for communication arises either because that is the primary purpose of the product (as in wireless devices), or because the product needs to inter-operate with other units on a network (as in Internet components). In many of these cases the product design involves more than one processor. Frequently, one processor is a micro-controller and another is a digital signal processor.

In a multiprocessor system, there is one set of development tools (compiler, assembler, linker, perhaps debugger) for each kind of processor. Traditionally, there was also an emulator for each kind of processor. However, as integrated circuit technology makes it increasingly practical to put the entire system on a chip, it becomes necessary to provide debug connection to multiple processors via a single hardware debug port. With traditional emulation technologies, there were three alternatives available:

1. Use a different emulator for each kind of processor. This would necessitate connecting/disconnecting emulators to switch between processor views. Only one processor would be debugable at a time.
2. Use a single emulator with target interface software that understood a particular kind of processor. To switch to a different processor view, different target interface software must be used. Only one processor would be debugable at a time.
3. Use a single emulator with target software built to understand the particular combination of processors in the system. In this scheme, all processors are debugable at once. However, to debug a different kind of target system (with different processor kinds), new emulation software must be built.

The first two schemes are inconvenient for the user who would like to be able to debug all processors on his system at the same time. The third scheme is difficult for the emulator provider, who must produce new target interface software every time an application with a different combination of processors arises.

SUMMARY OF THE INVENTION

From the foregoing it may be appreciated that a need has arisen to provide emulation capability that can be used with a variety of target systems involving different mixes of target processors. In accordance with one embodiment of the present invention, an emulator and target software structure is provided that supports for target systems with a variety of target processor configurations. This software structure provides for the dynamic (at time of use) combination of support modules for individual target processors into an emulator which can then support the desired mix of said target processors.

The dynamically linked emulation support system provides an interface for one or more debuggers to communicate with a mix of target processors via an enhanced JTAG debug link. The debugger for each processor on the target system connects to a target interface for that particular kind of target processor. That target interface then communicates with the emulator dynamic loader on the host computer to determine if support for the desired processor kind is present in the emulator. If it is not, a target interface is loaded onto the emulator and connected into the already running emulation software. A connection to this target interface software on the emulator is then provided to the target interface software on the host computer. The process is repeated for each debugger, for each kind of processor on the target system.

In a preferred implementation, a single debugger can support more than one processor or kind of processor. In this implementation, a system description file stored on the host computer describes the particular mix of processors to be supported. The debugger reads this system description to determine which kinds of target interfaces are required for operation. It then communicates with each required target interface to establish connection to the target system, as described above.

In this system for dynamic linking and loading of emulation software, support for a new target processor kind includes only the following modules:

1. A target interface module for the host computer that supports the new target processor kind.
2. A target interface module for the emulator that supports the new target processor kind.

Addition of only these modules enables the emulator to support the new target processor kind, as well as any combination of this new processor with previously supported processor kinds. The net result is a dramatic reduction in the emulation software effort required to support mixed processor systems.

BRIEF DESCRIPTION OF THE DRAWINGS

For a more complete understanding of the present invention, and the advantages thereof, reference is now made to the following descriptions taken in connection with the accompanying drawings, in which:

FIG. 1 illustrates a dynamically loaded emulation system in accordance with an embodiment of the present invention.

DETAILED DESCRIPTION OF THE INVENTION

An embodiment of the present invention and its advantages are best understood by referring now in more detail to FIG. 1 of the drawing. FIG. 1 illustrates a system for dynamic linking and loading of emulation software in accordance with one embodiment of the present invention. The system may be used in a data exchange system as described in co-pending application Ser. No. 60/171,392 filed Dec. 21, 1999 (nonprovisional application Ser. No. 09/738,241 filed Dec. 15, 2000) of Deao et al. entitled "Data Exchange System and Method for Processing". This application is incorporated herein by reference.

FIG. 1 depicts a dynamically loaded emulation system 100 that monitors the emulation of a software application on a target system in accordance with an embodiment of the present invention. Emulation system 100 includes a host computer 110, an emulator 140, and a target system 160. Target system 160 may consist of one or more processors 161, 162 of like or different kinds, combined together so as to be accessible through a JTAG debug link 150. An emulator 140 is used to provide a means to connect to and control the JTAG link 150 by way of a host computer connection 130. The host computer 110 provides the capability to run debuggers 116 connected to the emulator 140 by the host emulation software components 111 through 115.

A debugger 116 that requires the ability to debug a particular target processor 161 acquires this capability by connecting to a target interface module 111 built for the particular kind of target processor 161 desired. The target interface module 111 then queries the dynamic loader support 143 on emulator 140 to determine if support for the desired target processor kind is already present. This query is propagated via the ECOM modules 114, 144.

ECOM modules 114, 144 on the host and emulator provide communication between the emulator 140 and the host computer software components 111 through 113. The ECOM module on the host packages host-side requests into data messages that can be transferred over the emulator connection 130. The device drivers for this connection 115, 145 are responsible for propagating these data messages to and from the emulator. The ECOM module on the emulator 144 is responsible for converting data messages back into requests and presenting said requests to emulator-side software components 141 through 146. ECOM module 144 is also responsible for packaging replies to said requests into data messages, which are propagated back via drivers 145, 115 over connection 130 to the host-side ECOM module 114. ECOM module 114 then delivers said replies to the original requester.

If the query from target interface module 111 indicates that the desired target interface 141 is not yet present on the emulator 140, the emulator dynamic loader 113 is invoked to load said module 141. The dynamic loader obtains the target interface module desired 141 from a file on the host computer 118. The emulator dynamic loader then allocates memory for the target interface module's code and data on the emulator 140. Allocation of memory is performed by requesting space from the loader support module 143. This request is propagated via ECOM 114, 144 as described previously.

Having allocated memory for the target interface module 141, the dynamic loader 113 then modifies the file image of said module 118, and stores the modified image into the emulator 140. Storing of the modified image is accomplished via ECOM requests propagated to the loader support module 143. The dynamic loader 113 makes two kinds of modifications to the file image 118:

1. References in the file image 118 to allocated memory addresses are modified to reflect the memory actually allocated.
2. References in the file image 118 to other previously loaded software modules (for example, to the JTAG scan interface module 146) are modified to reflect the true location of the referenced modules.

The dynamic loader 113 remembers the locations assigned to each module loaded so that subsequently loaded modules may make references to previously loaded ones.

In a preferred implementation, target interface module 111 queries the emulator dynamic loader 113 to determine whether the desired target interface module 141 is present on the emulator. The dynamic loader 113 then queries the loader support 143. If the reply of the latter is negative, the dynamic loader 113 loads the target interface module 141. In either event, the dynamic loader module 113 returns an affirmative response to the initial query.

An additional debugger or debugger interface 116 can provide debugging of a different kind of target processor 162 in the target system 160 using the same mechanism described above. The debugger connects to the target interface module 112 for the different target kind 162. This target module 112 then queries the emulator dynamic loader 113 as before, resulting in the appropriate target interface module 142 being loaded on the emulator 140. By repetitive use of this method, the software support on the emulator 140 is built up out of target-specific support modules 118, until the combination is sufficient for the target system 160 in use.

In a preferred implementation, a single debugger interface 116 can support more than one processor. The debugger 116 determines the mix of processor kinds on the target system 160 by reading a system description file 117 resident on the host computer 110. For each processor kind described in the system description file 117, the debugger 116 connects to a target interface 111, 112 for that particular processor kind. The required emulation support is then loaded onto the emulator 140 by the same mechanism described above.

What is claimed is:

1. In a data exchange system for transferring data between a host processor and a target processor comprising a data unit on said target processor that transfers said data from said target processor to an emulator and a device driver on said host processor that transfers data from said emulator, a system for dynamically linking and loading emulation software support for a new target processor comprising:

a target interface module for the host computer that supports the new target processor kind; and a target interface module for the emulator that supports the new target processor kind.

2. A method for at time of use linking and loading of emulation software for one or more debuggers on a host computer to communicate with a mix of target processors via a JTAG debug link and emulator comprising the steps of: connecting a debugger for each processor to a target interface for that kind of processor; determining if there is support for that kind of processor in the emulator by the target interface communicating with a dynamic loader on the host computer; if not support loading a target interface into the emulator and connecting to an already running emulation software on the host computer; and connecting the target interface software on the emulator to the target interface software on the host computer.

3. The method of claim 2 wherein said steps are repeated for each debugger, for each kind of processor on the target system.

4. The method of claim 2 wherein said determining step includes communicating using ECOM modules on the host computer and emulator over a host computer to emulator connection.

5. A system for at time of use linking and loading of emulation software for one or more debuggers on a host computer to communicate with a mix of target processors via a JTAG debug link and emulator comprising: a debugger for each processor connected to a target interface for that type of processor; means for determining if there is support for that type of processor in the emulator by communicating with a dynamic loader on the host computer; means if there is no support for loading a target interface into the emulator and connecting to an already running emulation software on the host computer; and means for providing a connection to the target interface on the emulator to the target interface software on the host computer.

6. The system of claim 3 wherein a single debugger can support more than one kind of processor and including a system description file stored on the host computer describes a particular mix of processors to be supported and said debugger reads the system description to determine which kinds of target interfaces are required for operation and then it communicates with each required target interface to establish connection.

7. In combination: a single debugger that can support more than one processor or kind of processor; a system description file stored on a host computer describes the particular mix of processors to be supported; said debugger reads this system description to determine which kinds of target interfaces are required for operation and then communicates with each required target interface to establish connection to the target system.

8. The combination of claim 7 wherein said debugger determines if there is support for that kind of processor in the emulator by the target interface communicating with a dynamic loader on the host computer; if not support loads a target interface into the emulator and connects to an already running emulation software on the host computer; and connects the target interface software on the emulator to the target interface software on the host computer.

* * * * *